No. 743,382. Patented November 3, 1903.

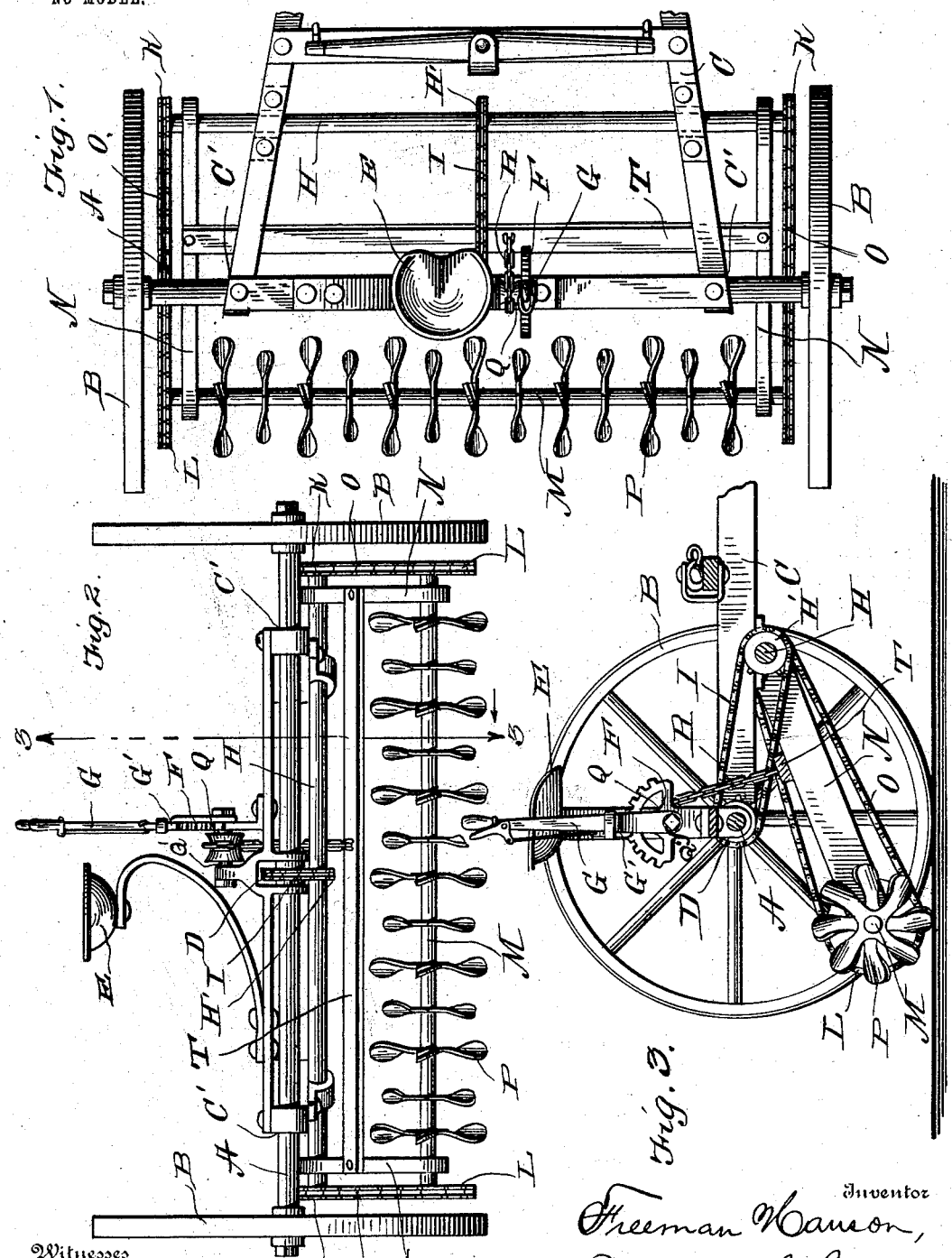

UNITED STATES PATENT OFFICE.

FREEMAN HANSON, OF HOLLIS CENTER, MAINE, ASSIGNOR OF ONE-HALF TO CHARLES B. HARMON, OF BIDDEFORD, MAINE.

ROTARY HARROW.

SPECIFICATION forming part of Letters Patent No. 743,382, dated November 3, 1903.

Application filed July 6, 1903. Serial No. 164,389. (No model.)

*To all whom it may concern:*

Be it known that I, FREEMAN HANSON, a citizen of the United States, residing at Hollis Center, in the county of York and State of Maine, have invented new and useful Improvements in Rotary Harrows, of which the following is a specification.

This invention relates to new and useful improvements in rotary harrows, and comprises a truck with tongue secured to the axle thereof and provided with a vertically-movable rack carrying a series of spiral cultivator-disks, said rack being mounted upon a counter-shaft which is driven by sprocket-wheel and chain connection to the main driving-axle, means being provided whereby the cultivator-disks may be raised or lowered to adapt the same for cutting at different depths in the ground.

The invention consists, further, in various details of construction and combinations and arrangements of parts, which will be hereinafter fully described and then specifically defined in the appended claim.

My invention is illustrated in the accompanying drawings, which, with the letters of reference marked thereon, form a part of this application, and in which—

Figure 1 is a top plan view of my improved rotary harrow or cultivator. Fig. 2 is a rear elevation of the machine, and Fig. 3 is a sectional view on line 3 3 of Fig. 2.

Reference now being had to the details of the drawings by letter, A designates an axle or main driving-shaft of the machine having wheels B mounted on and rotating therewith. Suitable shafts C are provided, which have loops C' at their rear ends, in which said shafts have bearings, and keyed to rotate with the main shaft is a sprocket-wheel D, and a suitable seat E is mounted upon the truck, also a toothed segment-plate F, while an operating-handle G is pivotally mounted upon the truck and has a spring-actuated pawl G', which is designed to engage the teeth of said segment-plate to hold the cultivator-disks to cut at different depths in the ground or to hold the same above the ground when not in use. A counter-shaft H is journaled in suitable bearings on the shaft C and has keyed thereto a sprocket-wheel H', about which and said sprocket-wheel D a driving-chain I passes, and N N designate beams which are pivotally mounted at their upper ends on the shafts H, and a cross-piece T connects said beams N. To the ends of said counter-shaft H are keyed sprocket-wheels K, and sprocket-wheels L, preferably of larger diameter than the sprocket-wheels K, are mounted on and adapted to rotate with the disk-carrying shaft M, which latter is journaled in suitable bearings in the rear ends of the beams N. (Shown clearly in Fig. 1 of the drawings.) Sprocket-chains O pass about the sprocket-wheels K and L at the ends of the shafts H and M, and fitted to rock with the shaft Q' is a drum Q, to the circumference of which one end of a chain R is secured, the other end of said chain being secured to a cross-piece T, and by the provision of which chain R and lever said shaft M may be raised and lowered and held in any desired position, accordingly as it may be desired to have the cultivator-disks cut at different depths in the soil or held entirely above the surface of the ground when not in use.

Mounted upon the shaft M is a series of spirally-arranged harrow-disks P, having wings which are bent in the shape illustrated in Fig. 1 of the drawings, and said disks are so arranged upon the shaft M, with which they rotate, that the wings of the various series of disks will be spirally arranged with reference to one another.

From the foregoing it will be observed that by the provision of a harrow embodying the features of my invention means is provided whereby the ground may be thoroughly worked and the depth at which it is desired to have the cultivator-disks cut may be regulated by the operator by throwing the lever backward or forward, and the apparatus for raising and lowering the cultivator-disks may be actuated without interfering with the main operating-shaft.

While I have shown a particular construction of apparatus embodying my improved rotary cultivator or harrow, it will be understood that I may make alterations in the details of construction of the machine without departing from the spirit of the invention.

Having thus fully described my invention, what I claim as new, and desire to secure by Letters Patent, is—

A rotary harrow comprising a driving-axle, wheels rotating therewith, shafts C supported at their rear ends by said axle, bearing-blocks mounted underneath said shafts, a shaft H mounted in said bearings, beams N pivotally mounted at their forward ends upon said shaft H, a cross-piece T connecting said beams N, a shaft M journaled in the lower rear ends of beams N and having harrow-teeth thereon, sprocket-wheels upon shaft H and said driving-axle and chain connections between said sprocket-wheels and sprocket wheel and chain connections between the shafts M and H, a seat-supporting cross-piece mounted over the driving-axle and having a yoke portion over said sprocket-chain, a stub-shaft Q' carried by said yoke portion, a winding-drum mounted upon said stub-shaft, a segment-bracket member in which said stub-shaft has a bearing at one end, and a pawl-carrying lever for engaging said segment, and a chain connected at one end to said cross-piece T and its other end fastened to said drum, as set forth.

In testimony whereof I have signed my name to this specification in the presence of two subscribing witnesses.

FREEMAN HANSON.

Witnesses:
ROMAIN S. RODRIGUE,
CHAS. A. MOODY.